Nov. 2, 1954 F. H. CHASE 2,693,572
CURRENT AND VOLTAGE REGULATION
Filed March 31, 1953
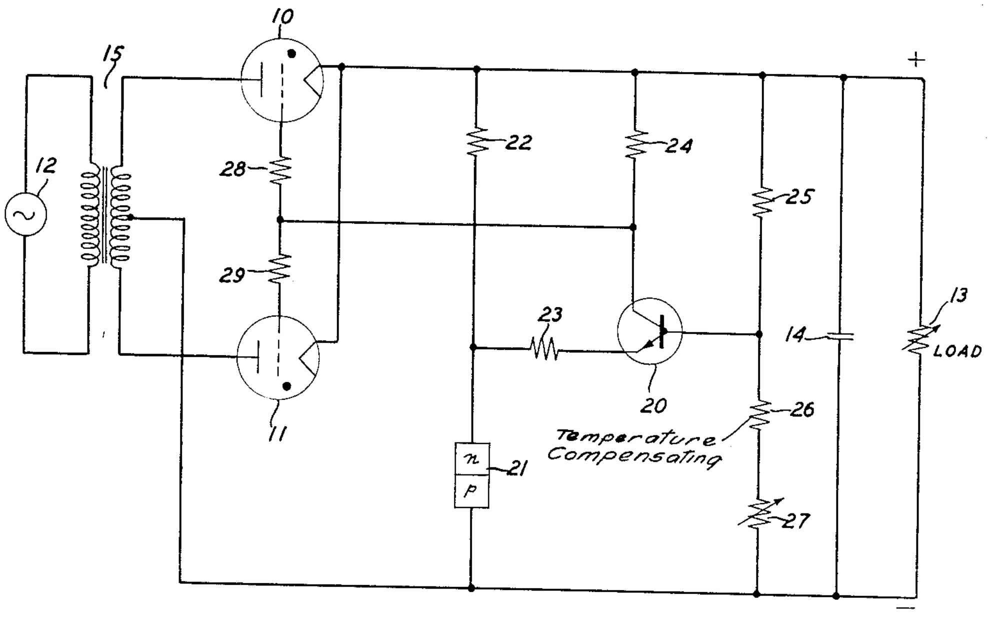
INVENTOR
F. H. CHASE
BY G. J. Heuerman
ATTORNEY 2,693,572

CURRENT AND VOLTAGE REGULATION

Fay H. Chase, Short Hills, N. J., assignor to Bell Telephone Laboratories, Incorporated, New York, N. Y., a corporation of New York Application March 31, 1953, Serial No. 345,781

10 Claims. (Cl. 323—22)

This invention relates to current and voltage regulation and more particularly to apparatus for controlling the supply of current from a current source to a load to minimize changes of load voltage.

An object of the invention is to provide an improved circuit including a Zener diode and a transistor for regulating the supply of current from a current source to a load.

Another object is to provide a circuit including a transistor and a Zener diode for setting up a control voltage and having means for reducing or substantially eliminating voltage changes due to changes of ambient temperature.

This invention is an improvement over the invention disclosed and claimed in my application Serial No. 274,951, filed March 5, 1952.

In a specific embodiment of the invention herein shown and described for the purpose of illustration, there is provided a grid controlled space current device for controlling the supply of direct current from a current source to a load. For example, the space current device may rectify current from an alternating-current supply source and control the amplitude of the rectified current in response to a biasing potential impressed upon its control electrode or grid with respect to its cathode potential. The biasing voltage is set up across a resistor through which current is supplied from the load circuit to the collector of an n-p-n type transistor. The current through the resistor and, therefore, the control electrode-cathode potential of the space current device, is controlled in response to load voltage changes to minimize the changes of load voltage. For this purpose there is provided a bridge circuit connected across the load for controlling the emitter-base voltage of the transistor. The bridge circuit comprises two parallel current paths connected across the load. The one path comprises a resistor and a Zener diode in series, one terminal of the diode being connected to the negative load terminal. The common terminal of this resistor and the Zener diode is connected through a resistive path to the emitter of the transistor. The second current path comprises two resistance arms in series, the base of the transistor being connected to the common terminal of these resistance arms. The resistance arm which connects the transistor base to the negative load terminal, preferably, comprises a temperature compensating resistor having a positive temperature coefficient of resistance.

The voltage across a Zener diode increases in response to an increase of ambient temperature, and vice versa. The main function of the temperature compensating resistance is to reduce changes of the emitter-base voltage of the transistor caused by the effect of ambient temperature changes on the voltage across the Zener diode, thereby reducing corresponding changes in the current supplied to the collector of the transistor. Degenerative stabilization employed in the transistor circuit reduces the effect of ambient temperature changes on the amplification of the transistor circuit. A secondary function of the temperature compensating resistance is to further reduce the effect of ambient temperature changes on the transistor amplification.

The invention will now be described in greater detail with reference to the accompanying drawing, the single figure of which is a schematic view of a regulated rectifier circuit embodying the invention.

Referring to the drawing, there is provided a rectifier comprising grid controlled, gas filled, space current tubes 10 and 11 for rectifying current from an alternating-current supply source 12 and for supplying the rectified current to a load 13 which may vary, a filtering condenser 14 being connected across the load. When the load circuit includes a floating battery connected across the load 13, the condenser 14 may not be required. There is provided a transformer 15 having a primary connected to the supply source 12 and a secondary the end terminals of which are connected to the anodes of tubes 10 and 11, respectively. A mid terminal of the secondary of transformer 15 is connected to the negative terminal of load 13 and the cathodes of tubes 10 and 11 are connected to the positive load terminal.

In regulated rectifiers used heretofore, load voltage variations were minimized by impressing between the control electrode and cathode of each rectifier tube a control voltage equal to the difference of a portion of the load voltage and a fixed reference voltage, the percentage variation of the control electrode-cathode voltage being large with respect to the corresponding percentage variation of the load voltage. This control voltage would have polarity such that an increase of load voltage would result in the control electrode being made more negative with respect to the cathode of each rectifier tube so as to reduce the current supplied through the rectifier tubes to the load, thereby minimizing the load voltage changes. There was employed for the reference voltage source either a dry cell battery or a small auxiliary regulated rectifier. The circuit employing the dry cell battery was found to be expensive to maintain since the battery had to be replaced periodically and the initial cost of the auxiliary regulated rectifier was found to be fairly expensive.

In accordance with the present invention, there is provided a source of control voltage for the rectifier tubes 10 and 11 which is an improvement over the prior control voltage sources referred to above and also less expensive. It comprises an n-p-n transistor 20, a Zener diode 21, resistors 22, 23, 24, 25, 26 and a variable resistor 27. The control voltage is set up across the resistor 24 the positive terminal of which is connected to the cathodes of tubes 10 and 11 and the negative terminal of which is connected through a resistor 28 to the control grid of tube 10 and through a resistor 29 to the control grid of tube 11. Resistors 28 and 29 are each of large resistance, say 100,000 ohms, to limit the flow of grid current under abnormal operating conditions. Zener diodes and their characteristics are disclosed in an application of W. Shockley, Serial No. 211,212, filed February 16, 1951. The Zener diode is a p-n junction rectifier poled so that current flows through it in the inverse or high resistance direction. The Zener or p-n junction diode 21 and a resistor 22 are connected in series in a current path across the load. The resistor 22 has a resistance value such that the magnitude of the current through the diode exceeds the so called Zener point so that the voltage drop across the diode will remain substantially constant irrespective of variations of current flowing through it. The collector of transistor 20 is connected through resistor 24 to the positive terminal of the load. The emitter of transistor 20 is connected through resistor 23 to the common terminal of resistor 22 and the Zener diode 21. The base of transistor 20 is connected through resistor 25 to the positive load terminal and through resistor 26 having a positive temperature coefficient of resistance and variable resistor 27 to the negative load terminal.

In operation, when the load voltage increases, for example, the voltage across resistors 26 and 27 rises to make the potential of the base of transistor 20 relatively more positive with respect to the potential of the emitter thereby increasing the current flowing into the base. The current flowing through resistor 24 into the collector of transistor 20 thus increases and the resulting increase of voltage across resistor 24 makes the control grids of tubes 10 and 11 more negative with respect to the potential of the cathodes of these tubes. The current supplied through rectifier tubes 10 and 11 to the load 13 therefore decreases to minimize the initially assumed rise of load voltage.

The transistor 20 has a minimum collector current, for a certain collector-emitter voltage, that cannot be reduced by changing the base current. The collector current including said minimum value of collector current increases as the ambient temperature is increased at a rate of about 5 or 10 percent per degree centigrade and vice versa. The current gain of transistors, that is, the ratio of the current flowing into the collector to the current flowing into the base may vary due to manufacturing variations. When using a resistor 23 having sufficient resistance relative to the resistance of resistor 24 the changes of collector current due to ambient temperature changes and to manufacturing variations of the transistor may be reduced to a small value which may be negligible. An increase of current flowing into the collector and out of the emitter through resistor 23, for example, makes the base of the transistor relatively more negative with respect to the emitter to cause a reduction of the collector current thereby compensating in large part for the increase of collector current. Of course this inverse feedback or degenerative stabilization will also reduce the amplification of the transistor circuit. It has been found that satisfactory results are obtained when the amplification of the transistor circuit is such as to produce a voltage change across resistor 24 about three times the voltage change across the load 13.

The Zener diode 21, rather than a cold cathode gas filled constant voltage device, is used as a source of standard voltage because it can be made for the low voltage values usually required in transistor circuits while the cold cathode tube cannot. The voltage across the Zaner diode increases slightly with increasing current therethrough, but this effect is negligible because the variations of the load voltage which are impressed across the current path comprising resistor 22 and the Zener diode 21 are small and, therefore, the current changes through the Zener diode are small. However, the voltage across the Zener diode increases as the ambient temperature increases at a rate of about 0.08 percent per degree centigrade. If no compensation for this effect were provided, an increase of ambient temperature would make the base of transistor 20 relatively more negative with respect to the emitter potential to reduce the collector current flowing through resistor 24, thereby causing the load voltage to rise. To reduce or substantially prevent this undesirable effect, the resistor 26 is made to have a positive temperature coefficient of resistance such that, as the ambient temperature increases to cause an increase of voltage across the Zener diode 21, the voltage across the resistor 26 will also increase.

Satisfactory results may be obtained by designing the resistor 26 so that voltage changes across resistor 26 due to ambient temperature changes are substantially equal to the voltage change across Zener diode 21 due to the ambient temperature changes. Preferably, however, the resistor 26 is designed to compensate not only for voltage changes across the diode 21 due to ambient temperature changes, but also to compensate for residual changes of collector current due to ambient temperature changes of the transistor. The resistor 26 may be made of a material having a positive temperature coefficient of resistance such as nickel wire for example, or it may have a portion of nickel wire and a portion of a material having a relatively small negligible temperature coefficient of resistance, such as carbon, or a wire of a suitable alloy may be used. If desired, two resistors may be used for the resistor identified by the numeral 26, the one resistor, such as carbon, having a small temperature coefficient of resistance and the other having a relatively large positive temperature coefficient of resistance, such as nickel wire. The correct resistance characteristic of resistor 26 is preferably determined empirically by substituting for resistor 26 a resistor having a negligibly small temperature coefficient of resistance and varying the resistance of the variable resistor 27, as the ambient temperature is changed, by the amounts required to maintain the voltage across resistor 24 constant, the load voltage also being maintained constant by varying the load 13 or the voltage of source 12, or both, if required.

In designing the grid biasing circuit, it is convenient to take advantage of the low collector-emitter voltage at which the transistor 20 will operate. This may be done by selecting a Zener diode having a standard voltage across its terminals slightly less than the required load voltage minus the maximum grid biasing voltage across resistor 24 required by the tubes 10 and 11. If for example, the required load voltage is 50 volts and the maximum grid biasing voltage required is 5 volts, a Zener diode having a standard voltage of 40 volts may be used.

The resistors 22, 23, 24 and 25 may have a temperature coefficient of resistance which is small or zero. For example, carbon resistors may be used. The variable resistor 27 preferably has a negligibly small or zero temperature coefficient of resistance. The resistance of resistor 24 may have any value between a certain minimum value and a certain maximum value which are determined as follows. When a minimum value of current flows into the collector of the transistor, the maximum value of resistor 24 should be such that the voltage across resistor 24 will be the minimum required grid biasing voltage for tubes 10 and 11. The emitter current is the sum of the collector current and the base current and the emitter current of a transistor should not exceed a certain limiting value, 5 milliamperes, for example. Also the power dissipation in a transistor should not exceed a certain limiting value, 50 milliwatts, for example. Within these limits of emitter current and power dissipation, the minimum resistance value of resistor 24 should be such that a maximum value of collector current will produce across resistor 24 a voltage equal to the maximum required grid biasing voltage for tubes 10 and 11.

Having selected a tentative ohmic value for resistor 24, the resistor 23 may be selected having a resistance approximately one fifth of the resistance of resistor 24. Using this resistance value of resistor 23 relative to the resistance of resistor 24 will cause the amplification of the transistor circuit to be reduced to a value of about three, that is, a small change of the load voltage will result in a voltage change across resistor 24 which is about three times the load voltage change. This amplification will considerably improve the regulation of the rectifier over an arrangement in which the grid biasing voltage is the difference of the load voltage or a portion thereof and the fixed voltage of a battery or an independent rectifier. This amplification or voltage gain can of course be reduced further by increasing the resistance of resistor 23 or the voltage gain can be increased by reducing the ohmic value of resistor 23. However, when the resistor 23 has a resistance value about one fifth that of resistor 24, the voltage gain is changed only by a relatively small amount in response to a large change of transistor current gain and the effect of ambient temperature change on the transistor is greatly reduced. The resistors 25, 26 and 27 should be selected so that the base of the transistor is positive with respect to the emitter potential by less than a certain maximum voltage, 0.2 volt, for example, such that the maximum limits of the emitter current and of the power dissipation of the transistor are not exceeded. The load voltage may be adjusted by changing the adjustment of resistor 27, the load voltage being reduced by increasing the resistance of resistor 27, and vice versa.

Instead of providing the compensation for ambient temperature changes in the resistor 26, the circuit may be designed to provide the compensation in one or a plurality of the resistors 23, 24 and 25. In such arrangements the temperature coefficient of resistance of resistor 24 should be positive and the temperature coefficient of resistance of resistors 23 and 25 should be negative.

What is claimed is:

1. The combination with a source of direct voltage having positive and negative terminals, a transistor having a collector, an emitter and a base, a first resistor connecting said collector to one of said positive and negative terminals, a constant voltage device, a second resistor, a first current path comprising said constant voltage device and said second resistor in series having end terminals connected to said positive and negative terminals respectively and having a first terminal common to said second resistor and said constant voltage device, a second current path comprising a first and a second resistive portion in series having end terminals connected to said positive and negative terminals respectively and having a second terminal common to said first and second resistive portions, a terminal of said constant voltage device and a terminal of said second resistive portion being connected to one of said positive and negative terminals, means for connecting said base to one of said first and second common terminals, means for connecting said emitter to the other of said first and second common terminals, said constant voltage device having the characteristic that the voltage across it changes in response to ambient temperature changes, and temperature compensating resistance means in said second current path for changing the voltage across said second resistive portion in response to said ambient temperature changes in the same sense as the voltage across said constant voltage device changes in response to the ambient temperature changes and by an amount at least as large as the voltage change across said constant voltage device in response to a certain change of ambient temperature.

2. A combination in accordance with claim 1 in which said means for connecting said emitter to the other of said first and second common terminals comprises a resistor.

3. A combination in accordance with claim 1 in which said constant voltage device is a p-n junction diode.

4. A combination in accordance with claim 2 in which said constant voltage device is a p-n junction diode.

5. The combination with a source of direct voltage having two terminals, of a transistor having a collector, an emitter and a base, a constant voltage device having a first and a second terminal, a first, a second, a third and a fourth resistance path each having a first and a second terminal, means comprising said first resistance path connecting said collector to one of said terminals of said direct voltage source, means for connecting the first terminal of said second resistance path to the first terminal of said third resistance path to form a first common terminal, means for connecting the second terminal of said second resistance path to one of said source terminals, means for connecting the second terminal of a said third resistance path to the other terminal of said source, means for connecting the first terminal of said fourth resistance path to the first terminal of said constant voltage device to form a second common terminal, means for connecting the second terminal of said fourth resistance path to said one of said source terminals, means for connecting the second terminal of said constant voltage device to said other terminal of said source, means for connecting one of said first and second common terminals to said base, means for connecting the other of said first and second common terminals to said emitter, and temperature compensating resistance means in one of said resistance paths for minimizing voltage changes across said first resistance path in response to ambient temperature changes.

6. A combination in accordance with claim 5 in which said means for connecting said other of said first and second common terminals to said emitter comprises a resistor.

7. In combination, a source of direct voltage having a positive and a negative terminal, an n-p-n transistor having a collector, an emitter and a base, a first resistor in a current path connecting said collector to said positive terminal, a second resistor in a current path connecting said base to said positive terminal, a p-n junction diode having a first and a second terminal, said first terminal being connected to said negative terminal, a third resistor in a current path connecting the second terminal of said diode to said positive terminal, means connecting said second terminal of said diode to said emitter, said diode having the characteristic that the voltage drop across its terminals is substantially constant when the ambient temperature is constant and increases at a predetermined rate in response to increase of ambient temperature and vice versa, and resistance means in a current path connecting said base to said negative terminal the voltage drop across which increases at a rate at least as large as said predetermined rate in response to increase of said ambient temperature and vice versa.

8. A combination in accordance with claim 7 in which said means connecting said second terminal of said diode to said emitter comprises resistance.

9. A current supply circuit for supplying direct current from a current supply source to a load comprising a space current device having an anode, a cathode, a control electrode and a space current path between said anode and said cathode, means for connecting said space current path in series with said source and said load, a transistor having a collector, an emitter and a base, means for conductively connecting said control electrode to said collector, a first resistor in a current path connecting said collector to a positive terminal of said load, a second resistor in a current path connecting said base to said positive load terminal, a p-n junction diode, a third resistor, a current path comprising said diode and said third resistor in series connected across said load, a terminal of said third resistor being connected to said positive load terminal and a terminal of said diode being connected to the negative terminal of said load, a fourth resistor, means comprising said fourth resistor connecting said emitter to the common terminal of said diode and said third resistor, said diode having the characteristic that the voltage drop across it rises at a predetermined rate in response to increase of ambient temperature and vice versa, and resistance means in a current path connecting said base to said negative load terminal the voltage drop across which increases at a rate at least as large as said predetermined rate in response to increase of said ambient temperature and vice versa.

10. A combination in accordance with claim 9 in which the amplification of said transistor increases in response to increase of said ambient temperature and vice versa and in which the rate of increase of said voltage drop across said resistance means in response to increase of said ambient temperature and vice versa is sufficiently large to compensate the voltage across said first resistor for the effect of said increasing amplification of said transistor and the effect of said voltage rise across said diode each in response to an increase of ambient temperature and vice versa.

References Cited in the file of this patent

UNITED STATES PATENTS

| Number | Name | Date |
|---|---|---|
| 2,474,269 | Martinez | June 28, 1949 |
| 2,630,557 | Bixby | Mar. 3, 1953 |
| 2,655,608 | Valdes | Oct. 13, 1953 |